United States Patent
Amonou et al.

(10) Patent No.: US 9,143,790 B2
(45) Date of Patent: Sep. 22, 2015

(54) ENCODING AND DECODING A VIDEO IMAGE SEQUENCE BY IMAGE AREAS

(75) Inventors: Isabelle Amonou, Sevigne (FR); Matthieu Moinard, Sevigne (FR); Isabelle Corouge, Rennes (FR)

(73) Assignee: FRANCE TELECOM, Paris (FR)

( * ) Notice: Subject to any disclaimer, the term of this patent is extended or adjusted under 35 U.S.C. 154(b) by 269 days.

(21) Appl. No.: 13/324,968

(22) Filed: Dec. 13, 2011

(65) Prior Publication Data

US 2012/0177115 A1 Jul. 12, 2012

(51) Int. Cl.
| | |
|---|---|
| H04N 19/00 | (2014.01) |
| H04N 19/136 | (2014.01) |
| H04N 19/105 | (2014.01) |
| H04N 19/176 | (2014.01) |
| H04N 19/11 | (2014.01) |

(52) U.S. Cl.
CPC ........... *H04N 19/136* (2014.11); *H04N 19/105* (2014.11); *H04N 19/11* (2014.11); *H04N 19/176* (2014.11)

(58) Field of Classification Search
CPC ..................................................... H04N 19/159
USPC ...................................................... 375/240.12
See application file for complete search history.

(56) References Cited

U.S. PATENT DOCUMENTS

| | | | | |
|---|---|---|---|---|
| 2003/0202594 | A1* | 10/2003 | Lainema ............... | 375/240.16 |
| 2008/0126278 | A1* | 5/2008 | Bronstein et al. ............ | 706/17 |
| 2009/0180538 | A1* | 7/2009 | Visharam et al. ........ | 375/240.15 |
| 2010/0239019 | A1* | 9/2010 | Bock et al. ............... | 375/240.16 |

FOREIGN PATENT DOCUMENTS

| | | |
|---|---|---|
| EP | 2101504 A2 | 9/2006 |
| WO | 2008082158 A1 | 7/2008 |
| WO | 2008083633 A1 | 7/2008 |
| WO | 2009037828 A1 | 3/2009 |

OTHER PUBLICATIONS

Tan et al.,"Intra Prediction by Template Matching", pp. 1693-1696, Oct. 1, 2006, Proceedings International Conference on Image Processing XP007902431.

* cited by examiner

*Primary Examiner* — Sath V Perungavoor
*Assistant Examiner* — Jeffery Williams
(74) *Attorney, Agent, or Firm* — Haverstock & Owens LLP

(57) ABSTRACT

A method for coding a sequence of video images comprising a cutting into zones of at least one current image of the sequence, characterized in that, for the coding of at least one target zone of said at least one current image, it comprises the steps of: determination (E2) of a set of candidate zones in previously coded and then decoded parts of images of the sequence, minimizing a prediction error calculated over the neighborhood of the target zone, formation (E3) of a set of groups of candidate zones in said set of candidate zones, as a function of a criterion of similarity between the candidate zones, identification (E6) of a best group in said set of groups, minimizing a reconstruction error with respect to the target zone, determination (E6) of an indication (n) representative of said identified best group; and coding (E7) of said indication (n).

24 Claims, 4 Drawing Sheets

ENCODING AND DECODING A VIDEO IMAGE SEQUENCE BY IMAGE AREAS

The present invention relates generally to the coding and decoding of video image sequences.

Current video coders (MPEG, H264 standards, etc.) use a block representation of the video sequence. The images are cut up into macro-blocks, each macro-block is itself cut up into blocks and each block or macro-block is coded by intra-image or inter-image prediction.

The invention applies in the context of this type of coding, but also in that of a region based coder (region based coding in the MPEG 4, JVT-ISO/IEC JTC1/SC29/WG11 standard, "Text of ISO/IEC 14496-10:200 X/FDIS Advanced Video Coding", Draft International Standard, w9198, 2007).

The invention relates more particularly to the prediction of a block, of a macroblock, of a region, or generally of a zone of the image to be coded.

The prediction is either carried out in intra mode, that is to say on the basis of data of the image undergoing coding, or in inter mode, that is to say on the basis of one or more other images of the sequence.

In intra mode, a macro-block or a block is predicted on the basis of its causal neighborhood (the adjacent pixels which have already been coded and then decoded), according to nine possible modes: eight by copying of the pixels according to a given orientation and one for the average.

In inter mode, a macro-block or a block is predicted on the basis of its temporal neighborhood, the H.264 standard uses a displacement in the sense of the motion. At least one motion vector is then coded and transmitted.

In both cases, the prediction is insufficient on its own, hence the necessity to code the prediction error (the residual). Accordingly, a DCT transform is used, followed by quantization and by conventional coding of the coefficients.

Moreover, in the domain of image synthesis, Wei and Levoy have proposed the so-called "template matching" technique (or Markov prediction of textures) to synthesize an image on the basis of a source image. Reference may be made to the article Wei, L. & Levoy, M. Akeley, K. (ed.) *Fast Texture Synthesis Using Tree-Structured Vector Quantization* Siggraph 2000, Computer Graphics Proceedings, ACM Press/ACM SIGGRAPH/Addison Wesley Longman, 2000, 479-488).

The technique of "template matching" is based on the correlations between neighbor pixels. The value of each pixel (or group of pixels) of the image to be synthesized is determined by comparing each neighbor of this pixel (target) with all the neighbors of a source image. The neighbors of the pixel to be synthesized are the pixels of the causal neighborhood, that is to say of the previously synthesized pixels. The pixel (or group of pixels) of the source image with the most similar neighborhood is assigned to the corresponding pixel (or group of pixels) of the image to be synthesized. The zones to be synthesized (pixels or groups of pixels) are synthesized by copying in a precise order, generally from top to bottom and from left to right (so-called "raster scan" order).

The closest neighborhood in the source image is chosen via criteria for minimizing a distance between the target and source neighborhoods, for example the quadratic error (or Sum of Squared Differences) or absolute error (or Sum of Absolute Differences).

The "template matching" scheme is a data synthesis scheme which is used in certain coders as an alternative to the intra prediction of the H264 coder (*Intra prediction by template matching*, article by Tan et al, 2006 IEEE, pages 1693 to 1696). In practice, a "template matching" mode is added to the nine other modes of intra prediction.

In the article by Tan, the "template matching" scheme is used to predict the blocks of size 4×4 pixels, themselves cut up into 2×2 pixel sub-blocks. The block to be predicted is considered to be the target (the image to be synthesized), the source being the partially decoded image.

The gains in terms of rate rise to 11%, with a rate of use of the new "template matching" intra prediction mode of the order of 30%.

The concept of "template matching" has been improved (Video Encoding Scheme Employing Infra and Inter Prediction Based on Averaged Template Matching Predictors, article by Suzuki et al., 2008, The Institute of Electronics, Information and Communication Engineers, pages 1127 to 1134). Suzuki et al. have noted that the best candidate in the sense of the "template matching" scheme is not necessarily the best representative for predicting the image. On the basis of this finding, Suzuki et al. have adapted the template matching scheme: a target is predicted on the basis of the average of the N best candidates.

With this scheme, the work zone is predicted by a weighting of the four best candidates in the sense of the "template matching" scheme. Therefore, the prediction has a "blurrier" rendition due to the averaging effect. Although the rate reduction is appreciable, this improvement to the standard scheme hardly improves, if at all, the intra prediction but homogenizes the residual.

In the case of inter-image prediction, the "template matching" scheme is used to estimate the motion of a block or macro-block from one image to the other on the basis of its neighborhood (Suzuki, Y.; Boon, C. S. & Kato, S. *Block-Based Reduced Resolution Inter Frame Coding with Template Matching Prediction* Image Processing, 2006 IEEE International Conference on, 2006, 1701-1704). The objective is to reduce the extra information necessary to code the motion vectors. For each temporally predicted macro-block, the "template matching" scheme is compared with the standard approach by searching for and coding the motion vector. A rate-distortion criterion makes it possible to determine the best scheme.

The aim of the present invention is to solve the drawbacks of the prior art.

To this end, the invention proposes a method for coding a sequence of video images comprising a cutting into zones of at least one current image of the sequence, characterized in that, for the coding of at least one target zone of said at least one current image, it comprises the steps of:

determination of a set of candidate zones in previously coded and then decoded parts of images of the sequence, minimizing a prediction error calculated over the neighborhood of the target zone, formation of a set of groups of candidate zones in said set of candidate zones, as a function of a criterion of similarity between the candidate zones, identification of a best group in said set of groups, minimizing a reconstruction error with respect to the target zone, determination of an indication representative of said identified best group, and coding of said indication.

By virtue of the invention, the so-called "template matching" scheme is used to determine a candidate set so as to predict an image zone. One therefore works on a neighborhood of the zone to be predicted.

Thereafter, the best candidate from among this set is determined, but differently from the "template matching" scheme. The determination of the best candidate relies on a prediction error calculation performed on the zone itself, rather than on its neighborhood.

Finally, the invention proposes to work on groups of candidate zones.

According to a preferred characteristic, the coding method furthermore comprises the steps of:
- determination of a representative for each group of the group set,
- identification of a best representative minimizing a reconstruction error with respect to the target zone.

According to alternative preferred characteristics, for a given group:
- the representative is an average of the candidate zones of the group,
- the representative is a candidate zone of the group which minimizes a reconstruction error with respect to the target zone.

According to a preferred characteristic, the determination of the set of candidate zones is performed on the basis of already coded and decoded zones of the current image.

This then entails an "intra" coding mode according to which a spatial prediction is used.

According to another alternative preferred characteristic, the determination of the set of candidate zones is performed on the basis of zones of images coded and decoded prior to the current image.

In this case, this entails an "inter" coding mode according to which a temporal prediction is used.

Thus, the invention applies equally well to "intra" coding as to "inter" coding.

According to a preferred characteristic, the set of groups is ordered and the indication representative of said identified best group is an index dependent on its order in the set.

The invention also relates to a method for decoding a sequence of video images comprising a cutting into zones of at least one current image of the sequence,
characterized in that, for the decoding of at least one target zone to be decoded of said at least one current image, it comprises the steps of:
- determination of a set of candidate zones in previously coded and then decoded parts of images of the sequence, minimizing a prediction error calculated over the neighborhood of the target zone,
- formation of a set of groups of candidate zones as a function of a criterion of similarity between the candidate zones,
- reading of an indication representative of a best group,
- reconstruction of the zone to be decoded on the basis of the best group.

The decoding method comprises steps very similar to those of the coding method.

According to a preferred characteristic, the determination of the set of candidate zones is performed on the basis of already decoded zones of the current image.

According to another alternative preferred characteristic, the determination of the set of candidate zones is performed on the basis of zones of images decoded prior to the current image.

These two alternatives correspond to the cases of "intra" and "inter" coding/decoding. Of course, the same mode is used for coding and for decoding.

According to a preferred characteristic, the set of groups is ordered according to a predetermined criterion and in that the indication representative of said identified best group depends on its order in the set.

The invention further relates to a device for coding a sequence of video images comprising a cutting into zones of at least one current image of the sequence,
characterized in that, for the coding of at least one target zone of said at least one current image, it comprises:
- means for determining a set of candidate zones in previously coded and then decoded parts of images of the sequence, minimizing a prediction error calculated over the neighborhood of the target zone,
- means for forming a set of groups of candidate zones in said set of candidate zones, as a function of a criterion of similarity between the candidate zones,
- means for identifying a best group in said set of groups, minimizing a reconstruction error with respect to the target zone,
- means for determining an indication representative of said identified best group, and
- means for coding said indication.

The invention also relates to a device for decoding a sequence of video images comprising a cutting into zones of at least one current image of the sequence,
characterized in that, for the decoding of at least one target zone to be decoded of said at least one current image, it comprises:
- means for determining a set of candidate zones in previously coded and then decoded parts of images of the sequence, minimizing a prediction error calculated over the neighborhood of the target zone,
- means for forming a set of groups of candidate zones as a function of a criterion of similarity between the candidate zones,
- means for reading an indication representative of a best group,
- means for reconstructing the zone to be decoded on the basis of the best group.

The coding and decoding devices exhibit advantages analogous to those of the methods.

The invention further relates to computer programs comprising instructions for implementing the methods presented above.

Other characteristics and advantages will become apparent on reading preferred embodiments described with reference to the figures in which.

Figure 1:
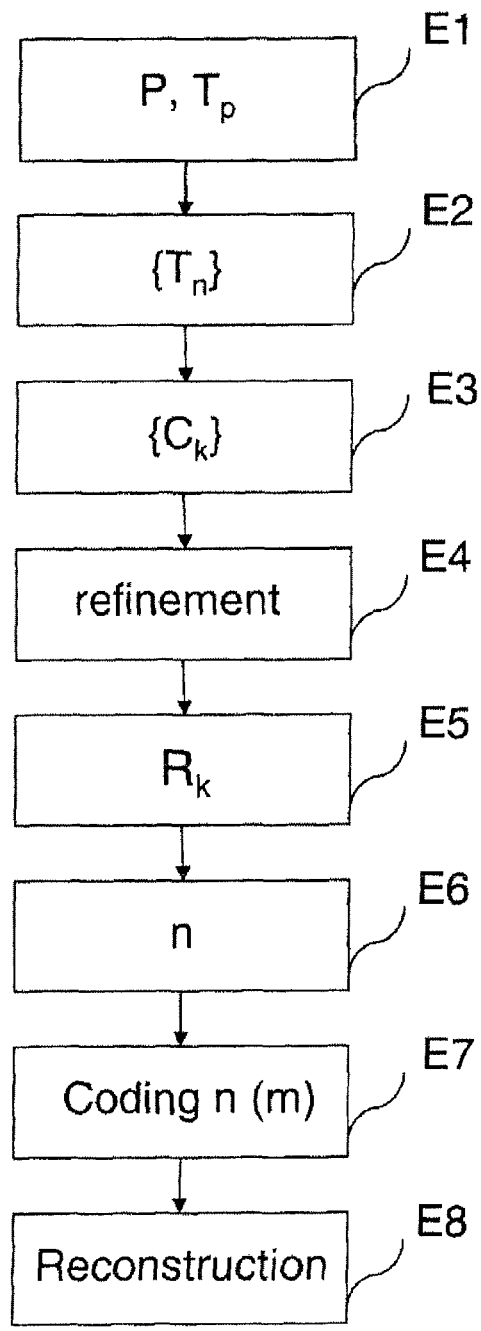
FIG. 1 represents a coding method embodiment according to the invention.

According to one embodiment of the invention represented in FIG. 1, the method of video image sequence coding comprises steps E1 to E8.

The images are coded one after another. For an image to be coded, at least one zone to be coded, termed the target zone, is previously formed in the image. This zone may be a block of pixels, a macro-block or more generally a region. Hereinafter, the case where blocks are formed in the image is more particularly considered.

An image is coded block by block. For a block to be coded, termed the target block, steps E1 to E8 are implemented.

Step E1 is the selection of a block to be coded P, termed the target block. The target block is of predetermined size. The neighborhood $T_p$ of the target block, termed the target neighborhood, is also considered. The target neighborhood is a predetermined set of neighbor pixels of the target block. The neighborhood of the target block is a causal mask.

A target block is associated in a one-to-one manner with a neighborhood.

Thus, for a target block of size 2×2 pixels, the causal mask is for example the set of five pixels which border the target block on its left and above it. According to another example, the causal mask which serves as neighborhood within the meaning of the invention comprises the twelve pixels which form a border two pixels thick on the left and above the target block of 2×2 pixels. Of course, other shapes and sizes of target block and neighborhood are usable according to the invention. For example, the neighborhood can furthermore include pixels in the right prolongation of the upper border of the target block.

The following step E2 is the search for the N candidate zones $T_n$ whose neighborhoods are closest to the target neighborhood $T_p$. In this step, one works on the neighborhoods, as in the so-called "template matching" scheme.

The search is done among already coded and decoded parts of images. Source zones associated in a one-to-one manner with source neighborhoods are considered. The source neighborhoods are constructed with respect to the source zones in a manner similar to what was done for the target. The candidate zones are sought from among the source zones thus formed.

Figure 2:
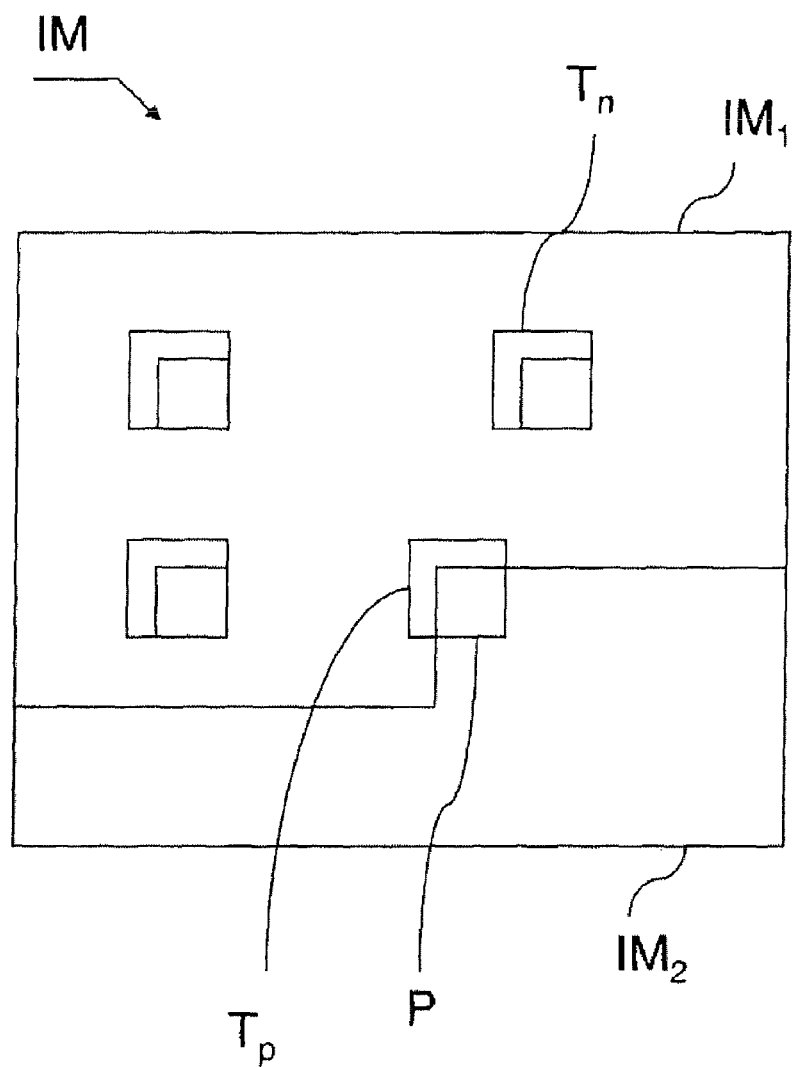
FIG. 2 represents an image undergoing coding by the method according to the invention.

In a so-called "intra" mode, the search for the candidate zones is done in the part of the current image previously coded and then decoded with respect to the current neighborhood zone, as represented in FIG. 2. In a so-called "inter" mode, the search is done in the images coded and then decoded, prior to the current image.

FIG. 2 represents the image IM undergoing coding. A part $IM_1$ of the image is already coded and serves as source for the candidate zones. A part $IM_2$ is not yet coded. An order of sweep of "raster scan" type is considered, but other sweeps are possible.

The search scheme is based on the correlations between neighborhoods of candidate zones and target neighborhood. The candidate zones are selected for example as a function of a minimization of quadratic or absolute error between the neighborhood of the candidate zone and the neighborhood of the target zone.

Step E2 is followed by step E3 in which a set of K groups (or clusters) $C_k$ of candidate zones is formed.

Accordingly, a so-called "clustering" scheme is used in such a way as to group together similar candidate zones.

The number of groups is predetermined or is determined dynamically.

In the first case, a scheme for grouping together the K averages, termed "K-means clustering" is used for example.

This scheme considers K points in a space which represents the objects to be grouped together. These K points define K centroids corresponding to K groups.

Each object to be grouped together is assigned to a group which has the closest centroid. When all the objects have been assigned to a group, the position of the K centroids is recalculated.

The steps of object assignment and of recalculating the positions of the centroids are repeated until the centroids are no longer modified.

When the number of groups to be formed is not specified a priori, a scheme based on threshold of quality, termed "QT clustering", for "Quality Threshold Clustering", is used for example.

The quality criterion is defined by the fact that the objects assigned to one and the same group are sufficiently close.

The groups are formed iteratively so as on the one hand to contain a predetermined minimum number of objects and on the other hand so that the objects of one and the same group are less than a predetermined threshold distance apart.

Whatever the scheme for forming the groups, the latter are ordered during this formation. An index is then assigned to each group as a function of this order. The sort may be done according to a criterion of similarity of the neighborhood of the centroid with respect to the target zone, or by the number of candidates from which the groups are composed. Indeed, if the cardinal of a group is large, this signifies that the pattern is often repeated in the image, and therefore that it is statistically more probable.

According to a variant, step E3 is followed by step E4 which is a refinement of the set of the candidate zones inside each group. In this step, for a given group, a similarity measurement is performed. As a function of a similarity criterion, a candidate zone is eliminated if it is too close to or too far from the other candidate zones of the group, since it might falsify the prediction.

The choice between the two possibilities of elimination of candidate zones depends on the variant used for the determination of a representative for each group (step E5).

Step E3 or step E4, when it is implemented, is followed by step E5 which is the determination of a representative $R_k$ for each group $C_k$ of the group set.

According to a first variant, the representative of a group is an average of the candidate zones of the group considered. In this case, if step E4 is implemented, it will eliminate the candidate zones that are too far from the other candidate zones of the group.

According to a second variant, the representative of a group is the candidate zone which minimizes a reconstruction error with respect to the target block. In this step, the blocks are now considered, rather than the neighborhoods. It is recalled that a neighborhood corresponds in a unique manner to a block. In this case, if step E4 is implemented, it will eliminate the candidate zones that are too close to the other candidate zones of the group.

For the second variant of step E5, the search is based on the correlations between candidate block and target block. A candidate block is selected as a function of a minimization of quadratic or absolute error between the candidate blocks and the target block.

The candidate blocks are then ordered inside each group, according to a predetermined criterion. For example, a group is sorted in decreasing order of proximity of the neighborhoods of the candidate blocks to the neighborhood of the target zone.

An index is assigned to each candidate block of the group. The index of the candidate block which is selected in this second variant of step E5 is denoted m.

According to a third variant of step E5, both types of representatives are determined, and a selection criterion is applied, for example based on a measurement of distance (for example the variance) between the candidates, so as to choose one or the other representative. If the candidates are fairly close to one another (low variance), the probability that the best representative is the average is high; if the candidates are fairly far apart, it is probable that the average representative may not be significant and in this case it will be chosen to transmit the index m. This third variant is particularly advantageous when the number of group is predetermined. Indeed, it is then possible for there to exist groups which are not very homogeneous.

The following step E6 is the identification of a best representative minimizing a reconstruction error with respect to the target zone.

In this step, the blocks are now considered, rather than the neighborhoods. It is recalled that a block corresponds to a neighborhood in a unique manner.

The search is based on the correlations between representatives of the groups and target block. A representative is selected as a function of a minimization of quadratic or absolute error between the representatives of the groups and the target block. The selection of a representative corresponds to the selection of the group associated with this representative.

The index of the group which is selected in step E6 is denoted n.

The following step E7 is the coding of the index n of the previously selected group.

In the variant where the representative is a candidate block, its index m determined in step E5 is also coded.

It should be noted that if refinement (step E4) has occurred, the candidate zones have been ordered in their respective group, it is then more probable that the candidate block selected is from among the first few of its group. The indices do not therefore have the same probability of being used. By allocating a probability of appearance to each index of the set, the cost of coding the index m is reduced by virtue of a conventional entropy coder.

The following step E8 is the reconstruction of the target block on the basis of the group selected in step E6.

The reconstruction of the target block comprises firstly the prediction of the target block, that is to say the copying of the data of the representative block to the target block. Next the reconstruction of the target block comprises the calculation of a residual between the target block and the predicted block. This residual is coded and then decoded so as to be added to the prediction to build the reconstructed block.

The reconstructed block enriches the source of the blocks that can be used to code a following block.

Figure 3:
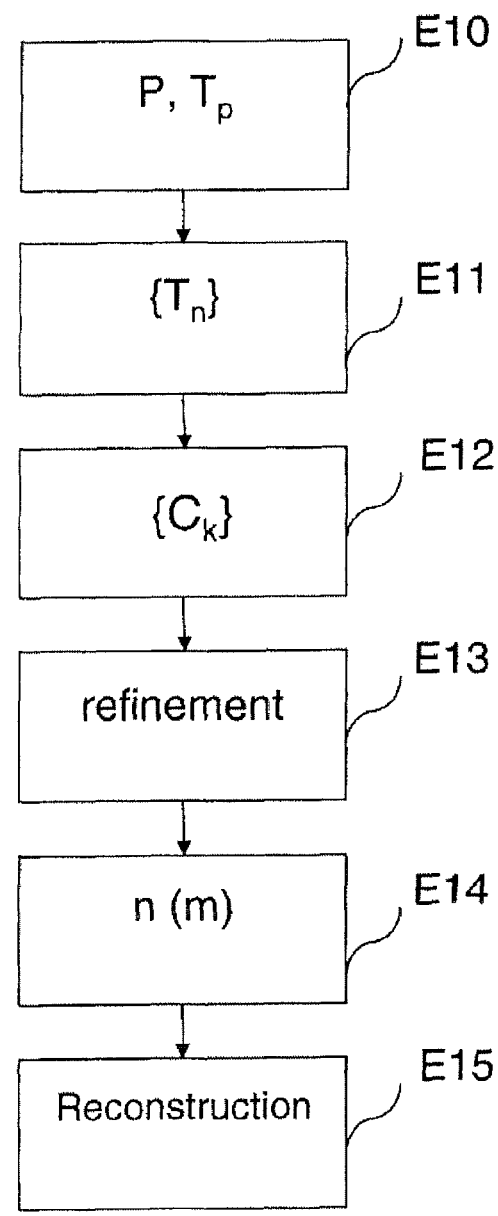
FIG. 3 represents a decoding method embodiment according to the invention.

According to one embodiment of the invention represented in FIG. 3, the method of video image sequence decoding comprises steps E10 to E15.

The images are decoded one after another. For an image to be decoded, at least one zone to be decoded is previously considered in the image. This zone may be a block of pixels, a macro-block or more generally a region. Hereinafter, the case where blocks are formed in the image is more particularly considered.

An image is decoded block by block. For a block to be decoded, termed the target block, steps E10 to E15 are implemented.

Steps E10 to E13 are very similar respectively to steps E1 to E4 described previously.

Step E10 is the selection of a block to be decoded P, termed the target block. The target block is of predetermined size. The neighborhood $T_p$ of the target block, termed the target neighborhood, is also considered. The neighborhood is identical to that which was considered for the coding.

The following step E11 is the search for the N neighborhoods of the candidate zones $T_n$ closest to the neighborhood $T_p$. In this step, one works on the neighborhoods, as in the so-called "template matching" scheme.

The search is done from among already decoded parts of images. In a mode termed "intra", the search for the candidate zones is done in the part of the current image previously decoded with respect to the current neighborhood zone. In a mode termed "inter", the search is done in the images decoded prior to the current image.

The search scheme is based on the correlations between neighborhoods of the candidate zones and the target neighborhood. The neighborhoods of the candidate zones are selected for example as a function of a minimization of quadratic or absolute error between neighborhood of the candidate zone and the neighborhood of the target zone.

The following step E12 is the formation of a set of K groups $C_k$ of candidate zones.

Accordingly, a so-called "clustering" scheme is used in such a way as to group together similar candidate zones.

The number of groups is predetermined or is determined dynamically.

The scheme used is identical to that used during coding. The groups are ordered by the scheme for forming the groups.

According to a variant, step E12 is followed by step E13 which is a refinement of the candidate zones inside each group. In this step, for a given group, a similarity measurement is performed. As a function of a similarity criterion, a candidate zone is eliminated if it is too close to or too far from the other candidate zones of the group, since it might falsify the prediction. This refinement is performed if the similar refinement step was performed during the prior coding. The refinement performed for decoding is then identical to that which was performed during coding.

Step E12 or step E13, when it is implemented, is followed by step E14 which is the decoding of the group index n. This decoding depends on the coding of the index which was performed in step E7. According to a variant, step E14 furthermore comprises the decoding of the index m of the candidate zone which is the representative of the group.

The following step E15 which is the reconstruction of the target block on the basis of the group identified by the group index n and to which a representative, for example an average of the blocks of the group, corresponds. As a variant, the reconstruction of the target block is carried out on the basis of the group and of its representative that were identified by the indices n and m. In both cases, this step comprises a prediction of the target block on the basis of the representative block of the group and a decoding of the residual which is added to the result of the prediction. The reconstructed block thereafter forms part of the data which may be used for the prediction of following blocks.

Figure 4:
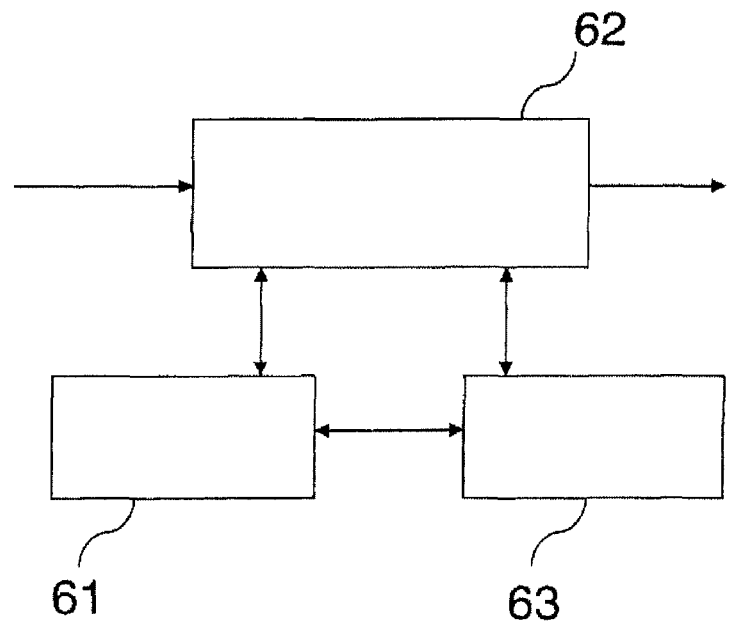
FIG. 4 represents a coding device embodiment according to the invention.
Figure 5:
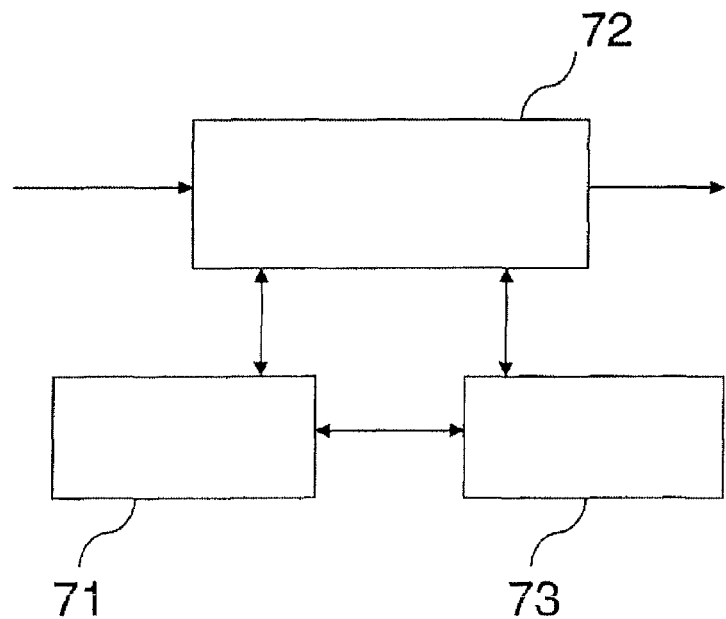
FIG. 5 represents a decoding device embodiment according to the invention.

FIGS. 4 and 5 represent the simplified structures of a coding device and of a decoding device implementing respectively a coding technique and a decoding technique such as are described hereinabove.

A coding device such as illustrated in FIG. 4 comprises a memory 61 comprising a buffer memory, a processing unit 62, equipped for example with a microprocessor, and driven by the computer program 63, implementing the coding method according to the invention.

On initialization, the code instructions of the computer program 63 are for example loaded into a RAM memory before being executed by the processor of the processing unit 62. The processing unit 62 receives a current image to be coded. The microprocessor of the processing unit 62 implements the steps of the previously described coding method, according to the instructions of the computer program 63, so as to code the current image. For the coding of at least one target zone of said at least one current image, the coding device comprises, in addition to the buffer memory 61:

means for determining a set of candidate zones in previously coded and then decoded parts of images of the sequence, minimizing a prediction error calculated over the neighborhood of the target zone, means for forming a set of groups of candidate zones in said set of candidate zones, as a function of a similarity criterion, means for identifying a best group in said set of groups, minimizing a reconstruction error with respect to the target zone, means for determining an indication representative of said identified best group.

These means are driven by the microprocessor of the processing unit 62.

A decoding device such as illustrated in FIG. 5 comprises a memory 71 comprising a buffer memory, a processing unit 72, equipped for example with a microprocessor, and driven by the computer program 73, implementing the decoding method according to the invention.

On initialization, the code instructions of the computer program 73 are for example loaded into a RAM memory before being executed by the processor of the processing unit 72. The processing unit 72 receives as input a signal representative of at least one coded image. The microprocessor of the processing unit 72 implements the steps of the previously described decoding method, according to the instructions of the computer program 73, so as to reconstruct the current image. For the decoding of at least one target zone to be decoded of said at least one current image, the decoding device comprises, in addition to the buffer memory 71:

means for determining a set of candidate zones in previously coded and then decoded parts of images of the sequence, minimizing a prediction error calculated over the neighborhood of the target zone, means for forming a set of groups of candidate zones as a function of a similarity criterion, means for reading an indication representative of a best group, means for reconstructing the zone to be decoded on the basis of the best group.

These means are driven by the microprocessor of the processing unit 72.

The invention claimed is:

1. A method for coding a sequence of video images comprising a cutting into zones of at least one current image of the sequence, characterized in that, for the coding of at least one target zone of said at least one current image, it comprises the steps of:

determination of a target neighborhood associated to said at least one target zone, said target neighborhood being a predetermined set of neighbor pixels of the target zone, determination of candidate neighborhoods associated respectively to source candidate zones belonging to previously coded and then decoded parts of images of the sequence, for a candidate neighborhood considered, calculation of a prediction error over the neighborhood of the target zone comprising calculating of a difference between the pixels of the candidate neighborhood considered and corresponding pixels of the neighborhood of the target zone, repetition of the calculation of a prediction error over the neighborhood for all the determined candidate neighborhoods, selection of candidate neighborhoods for which the corresponding prediction error is minimal, formation of a number K of groups of candidate neighborhoods from said selected candidate neighborhoods, as a function of a criterion of similarity between the candidate neighborhoods, determination of at least one representative for each group of candidate neighborhoods of said set of K groups, said representative of a given group being:

either a zone of pixels which is an average of the candidate zones which are associated respectively to candidate neighborhoods of the given group, the value of each pixel of the zone of pixels being equal to the average of the values of corresponding pixels of the candidate zones, or a candidate zone which is associated to a candidate neighborhood of the given group and which minimizes a reconstruction error with respect to the target zone, identification of a best representative minimizing a reconstruction error with respect to the target zone, identification of the group containing the best representative as the best group of candidate neighborhoods in said number K of groups of candidate neighborhoods, determination of an indication representative of said identified best group of candidate neighborhoods; and coding of said indication.

2. The coding method as claimed in claim 1, characterized in that the determination of candidate neighborhoods is performed on the basis of already coded and decoded zones of the current image.

3. The coding method as claimed in claim 1, characterized in that the determination of candidate neighborhoods is performed on the basis of zones of images coded and decoded prior to the current image.

4. The coding method as claimed in claim 1, characterized in that the number K of groups of candidate neighborhoods are ordered and in that the indication representative of said identified best group is an index dependent on its order in the set.

5. A method for decoding a sequence of video images comprising a cutting into zones of at least one current image of the sequence, characterized in that, for the decoding of at least one target zone to be decoded of said at least one current image, it comprises the steps of:

determination of a target neighborhood associated to said at least one target zone, said target neighborhood being a predetermined set of neighbor pixels of the target zone, determination of candidate neighborhoods in previously decoded parts of images of the sequence, for a candidate neighborhood considered, calculation of a prediction error over the neighborhood of the target zone comprising calculating of a difference between the pixels of the candidate neighborhood considered and corresponding pixels of the neighborhood of the target zone, repetition of the calculation of a prediction error over the neighborhood for all the determined candidate neighborhoods, selection of candidate neighborhoods for which the corresponding prediction error is minimal, formation of a number K of groups of candidate neighborhoods from said selected candidate neighborhoods as a function of a criterion of similarity between the candidate neighborhoods, reading of an indication representative of a best group, identification of a best representative of said best group associated to said read indication, said best representative minimizing a reconstruction error with respect to the target zone, reconstruction of the target zone on the basis of the best representative.

6. The decoding method as claimed in claim 5, characterized in that the determination of candidate zones is performed on the basis of already decoded zones of the current image.

7. The decoding method as claimed in claim 5, characterized in that the determination of candidate zones is performed on the basis of zones of images decoded prior to the current image.

8. The decoding method as claimed in claim 5, characterized in that the number K of groups of candidate neighborhoods are ordered according to a predetermined criterion and in that the indication representative of said identified best group depends on its order in the set.

9. A device for coding a sequence of video images comprising a cutting into zones of at least one current image of the sequence, characterized in that, for the coding of at least one target zone of said at least one current image, it comprises:

means for determining a target neighborhood associated to said at least one target zone, said target neighborhood being a predetermined set of neighbor pixels of the target zone, means for determining a set of candidate neighborhoods in previously coded and then decoded parts of images of the sequence, for a candidate neighborhood considered, calculation of a prediction error over the neighborhood of the target zone comprising calculating of a difference between the pixels of the candidate neighborhood considered and corresponding pixels of the neighborhood of the target zone repetition of the calculation of a prediction error over the neighborhood for all the determined candidate neighborhoods, means for selecting candidate neighborhoods for which the corresponding prediction error is minimal, means for forming a number K of groups of candidate neighborhoods from said selected candidate neighborhoods, as a function of a criterion of similarity between the candidate neighborhoods, means for determining at least one representative for each group of candidate neighborhoods of said set of K groups, said representative of a given group being:

either a zone of pixels which is an average of the candidate zones which are associated respectively to candidate neighborhoods of the given group, the value of each pixel of the zone of pixels being equal to the average of the values of corresponding pixels of the candidate zones, or a candidate zone which is associated to a candidate neighborhood of the given group and which minimizes a reconstruction error with respect to the target zone, means for identifying a best representative minimizing a reconstruction error with respect to the target zone, means for identifying the group containing the best representative as the best group of candidate neighborhoods in said number K of groups of candidate neighborhoods, means for determining an indication representative of said identified best group of candidate neighborhoods;

means for coding said indication.

10. A device for decoding a sequence of video images comprising a cutting into zones of at least one current image of the sequence, characterized in that, for the decoding of at least one target zone to be decoded of said at least one current image, it comprises:

means for determining a target neighborhood associated to said at least one target zone, said target neighborhood being a predetermined set of neighbor pixels of the target zone, means for determining candidate neighborhoods in previously decoded parts of images of the sequence, for a candidate neighborhood considered, calculation of a prediction error over the neighborhood of the target zone comprising calculating of a difference between the pixels of the candidate neighborhood considered and corresponding pixels of the neighborhood of the target zone, repetition of the calculation of a prediction error over the neighborhood for all the determined candidate neighborhoods, means for selecting candidate neighborhoods for which the corresponding prediction error is minimal, means for forming a number K of groups of candidate neighborhoods from said selected candidate neighborhoods as a function of a criterion of similarity between the candidate neighborhoods, means for reading an indication representative of a best group, means for identifying a best representative of said best group associated to the read indication, said best representative minimizing a reconstruction error with respect to the target zone, means for reconstructing said target zone on the basis of the best representative.

11. A computer program executed by a processor and stored on a non-transitory computer-readable medium, the computer program comprising instructions for the implementation of a method for coding a sequence of video images comprising a cutting into zones of at least one current image of the sequence, characterized in that, for the coding of at least one target zone of said at least one current image, the method comprises the steps of:

determination of a target neighborhood associated to said at least one target zone, said target neighborhood being a predetermined set of neighbor pixels of the target zone, determination of candidate neighborhoods associated respectively to source candidate zones belonging to previously coded and then decoded parts of images of the sequence, for a candidate neighborhood considered, calculation of a prediction error over the neighborhood of the target zone comprising calculating of a difference between the pixels of the candidate neighborhood considered and corresponding pixels of the neighborhood of the target zone, repetition of the calculation of a prediction error over the neighborhood for all the determined candidate neighborhoods, selection of candidate neighborhoods for which the corresponding prediction error is minimal, formation of a number K of groups of candidate neighborhoods from said selected candidate neighborhoods, as a function of a criterion of similarity between the candidate neighborhoods, determination of a representative for each group of candidate neighborhoods of said set of K groups, identification of a best representative minimizing a reconstruction error with respect to the target zone, identification of the group containing the best representative as the best group of candidate neighborhoods in said number K of groups of candidate neighborhoods, determination of an indication representative of said identified best group of candidate neighborhoods; and coding of said indication.

12. A computer program executed by a processor and stored on a non-transitory computer readable medium, the computer program comprising instructions for the implementation of a method for decoding a sequence of video images comprising a cutting into zones of at least one current image of the sequence, characterized in that, for the decoding of at least one target zone to be decoded of said at least one current image, it comprises the steps of:

determination of a target neighborhood associated to said at least one target zone, said target neighborhood being a predetermined set of neighbor pixels of the target zone, determination of candidate neighborhoods in previously decoded parts of images of the sequence, for a candidate neighborhood considered, calculation of a prediction error over the neighborhood of the target zone comprising calculating of a difference between the pixels of the candidate neighborhood considered and corresponding pixels of the neighborhood of the target zone, repetition of the calculation of a prediction error over the neighborhood for all the determined candidate neighborhoods, selection of candidate neighborhoods for which the corresponding prediction error is minimal, formation of a number K of groups of candidate neighborhoods from said selected candidate neighborhoods as a function of a criterion of similarity between the candidate neighborhoods, reading of an indication representative of a best group, identification of a best representative of said best group associated to said read indication, said best representative minimizing a reconstruction error with respect to the target zone, reconstruction of the target zone on the basis of the best representative.

13. The coding method as claimed in claim 1, characterized in that the determination of candidate neighborhoods is performed on the basis of already coded and decoded zones of the current image.

14. The coding method as claimed in claim 1, characterized in that the determination of candidate neighborhoods is performed on the basis of already coded and decoded zones of the current image.

15. The coding method as claimed in claim 1, characterized in that the determination of candidate neighborhoods is performed on the basis of already coded and decoded zones of the current image.

16. The coding method as claimed in claim 1, characterized in that the determination of candidate neighborhoods is performed on the basis of zones of images coded and decoded prior to the current image.

17. The coding method as claimed in claim 1, characterized in that the determination of candidate neighborhoods is performed on the basis of zones of images coded and decoded prior to the current image.

18. The coding method as claimed in claim 1, characterized in that the determination of candidate neighborhoods is performed on the basis of zones of images coded and decoded prior to the current image.

19. The coding method as claimed in claim 1, characterized in that the K groups of candidate neighborhoods are ordered and in that the indication representative of said identified best group is an index dependent on its order in the set.

20. The coding method as claimed in claim 1, characterized in that the K groups of candidate neighborhoods are ordered and in that the indication representative of said identified best group is an index dependent on its order in the set.

21. The coding method as claimed in claim 2, characterized in that the K groups of candidate neighborhoods are ordered and in that the indication representative of said identified best group is an index dependent on its order in the set.

22. The coding method as claimed in claim 3, characterized in that the K groups of candidate neighborhoods are ordered and in that the indication representative of said identified best group is an index dependent on its order in the set.

23. The decoding method as claimed in claim 6, characterized in that K groups of candidate neighborhoods are ordered according to a predetermined criterion and in that the indication representative of said identified best group depends on its order in the set.

24. The decoding method as claimed in claim 7, characterized in that K groups of candidate neighborhoods are ordered according to a predetermined criterion and in that the indication representative of said identified best group depends on its order in the set.

* * * * *